United States Patent

Krueger et al.

Patent Number: 5,296,516
Date of Patent: Mar. 22, 1994

[54] POLYURETHANE AND POLYISOCYANURATE RIGID FOAMS PREPARED USING TERNARY BLOWING AGENT MIXTURES

[75] Inventors: David C. Krueger, Grosse Ile; Curtis J. Reichel, Southgate, both of Mich.

[73] Assignee: BASF Corporation, Parsippany, N.J.

[21] Appl. No.: 987,865

[22] Filed: Dec. 9, 1992

[51] Int. Cl.$^5$ .............................. C08J 9/08; C08J 9/14
[52] U.S. Cl. .................................... 521/131; 521/155; 521/910
[58] Field of Search ...................... 521/131, 155, 910

[56] References Cited

U.S. PATENT DOCUMENTS

| | | | |
|---|---|---|---|
| 4,205,136 | 5/1980 | Ohashi et al. | 521/131 |
| 4,661,533 | 4/1987 | Stobby | 521/131 |
| 5,124,366 | 6/1992 | Gluck | 521/128 |
| 5,147,898 | 9/1992 | Saito | 521/172 |

*Primary Examiner*—Morton Foelak
*Attorney, Agent, or Firm*—Dennis V. Carmen

[57] ABSTRACT

Use of a ternary blowing agent mixture containing water, HCFC-22, and either or both of methylene chloride or 1,1,1-trichloroethane allows the preparation of rigid urethane and polyisocyanurate foams displaying good dimensional stability and low aged k-factors.

10 Claims, No Drawings

POLYURETHANE AND POLYISOCYANURATE RIGID FOAMS PREPARED USING TERNARY BLOWING AGENT MIXTURES

BACKGROUND OF THE INVENTION

1. Field of the Invention

The present invention pertains to rigid polyurethane and polyisocyanurate foams. More particularly, the present invention pertains to such foams prepared employing as the blowing agent, a ternary blowing agent system containing HCFC-22, water, and either or both of methylene chloride or 1,1,1-trichloroethane.

2. Background of the Invention

Due to environmental concerns, the use of chlorofluorocarbons (CFC's) as blowing agents for plastic foams has come under increasing scrutiny, and such blowing agents are scheduled to be phased out early in the next decade. In the United States, such blowing agents are also subject to increasing taxation to deter their use.

Water has become an acceptable substitute for CFCs in a variety of polyurethane foams, particularly for polyurethane flexible foams. However, in rigid foams, where low thermal conductivity is an important factor, use of water alone as a blowing agent produces foams containing carbon dioxide in the cells, resulting in foams with undesirably high k-factors. The use of water in conjunction with blowing agents having low ozone depletion potential such as monochlorodifluoromethane (refrigerant 22, R-22, HCFC-22) has improved k-factors measurably, however the dimensional stability of such foams often suffers, particularly at low densities, and the aged k-factors also could stand improvement. Finally, since HCFC-22 is a gas, the amount of HCFC-22 useable in a formulation is often limited due to the lack of pressurized tanks and other equipment to relatively low amounts, c.a. 1–5 weight percent. At this low level, appreciable amounts of water must be utilized to keep foam density down. Use of pressurized equipment can minimize this drawback, but the foams produced with high levels of HCFC-22 are undesirably flammable.

SUMMARY OF THE INVENTION

It has now been surprisingly discovered that rigid polyurethane and polyisocyanurate foams having good dimensional stability and aged k-factors may be prepared using a ternary blowing agent mixture comprising water, HCFC-22, and either or both of methylene chloride or 1,1,1-trichloroethane (hereinafter, TCE). These foams also show increased flame retardancy when compared to foams blown with water and HCFC-22.

DESCRIPTION OF THE PREFERRED EMBODIMENTS

In the more than fifty years since Professor Otto Bayer discovered the addition polymerization reaction leading to polyurethanes (1937), the field of polyurethane polymers has become a well established, mature technology. While the first uses of polyurethanes were in the field of fibers, rigid foams were developed in 1947 and flexible foams in 1952. In the year 1981, world production of polyurethanes exceeded 3 million metric tons.

By the term "polyurethane" is meant a polymer whose structure contains predominately urethane

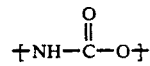

linkages between repeating units. Such linkages are formed by the addition reaction between an organic isocyanate group R—[—NCO]and an organic hydroxyl group [HO—]—R. In order to form a polymer, the organic isocyanate and hydroxyl group-containing compounds must be at least difunctional. However, as modernly understood, the term "polyurethane" is not limited to those polymers containing only urethane linkages, but includes polymers containing allophanate, biuret, carbodiimide, oxazolinyl, isocyanurate, uretidinedione, and urea linkages in addition to urethane. The reactions of isocyanates which lead to these types of linkages are summarized in the *Polyurethane Handbook*, Gunter Vertel, Ed., Hanser Publishers, Munich, Oc1985, in Chapter 2, pages 7–41; and in *Polyurethanes: Chemistry and Technology*, J.H. Saunders and K.C. Frisch, Interscience Publishers, New York, 1963, Chapter Ill, pages 63–118. In addition to polyols (polyhydroxyl-containing monomers), the most common isocyanate-reactive monomers are amines and alkanolamines. In these cases, reaction of the amino group leads to urea linkages interspersed within the polyurethane structure.

The urethane forming reaction is generally catalyzed. Catalysts useful are well known to those skilled in the art, and many examples may be found for example, in the *Polyurethane Handbook*, Chapter 3, §3.4.1 on pages 90–95; and in *Polyurethanes: Chemistry and Technology* in Chapter IV, pages 129–217. Most commonly utilized catalysts are tertiary amines and organotin compounds, particularly dibutyltin diacetate and dibutyltin dilaurate. Combinations of catalysts are often useful also.

In the preparation of polyurethanes, the isocyanate is reacted with the active hydrogen-containing compound(s) in an isocyanate to active hydrogen ratio of from 0.5 to 1 to 10 to 1. The "index" of the composition is defined as the —NCO/active hydrogen ratio multiplied by 100. While the extremely large range described previously may be utilized, most polyurethane processes have indices of from 90 to about 120 or 130, and more preferably from 95 to about 110. In the case of polyurethanes which also contain significant quantities of isocyanurate groups, indices of greater than 200 and often greater then 300 may be used in conjunction with a trimerization catalyst in addition to the usual polyurethane catalysts. In calculating the quantity of active hydrogens present, in general all active hydrogen containing compounds other then non-dissolving solids are taken into account. Thus the total is inclusive of polyols, chain extenders, reactive plasticizers, etc.

Hydroxyl group-containing compounds (polyols) useful in the preparation of polyurethanes are described in the *Polyurethane Handbook* in chapter 3, §3.1 pages 42–61; and in *Polyurethanes: Chemistry and Technology* in Chapter II, §§III and IV, pages 32–47. Many hydroxyl-group containing compounds may be used, including simple aliphatic glycols, dihydroxy aromatics, bisphenols, and hydroxyl-terminated polyethers, polyesters, and polyacetals, among others. Extensive lists of suitable polyols may be found in the above references and in many patents, for example in columns 2 and 3 of U.S. Pat. No. 3,652,639; columns 2–6 of U.S. Pat. No. 4,421,872: and columns 4–6 of U.S. Pat. No. 4,310,632;

these three patents being hereby incorporated by reference.

Preferably used are hydroxyl-terminated polyoxyalkylene and polyester polyols. The former are generally prepared by well known methods, for example by the base catalyzed addition of an alkylene oxide, preferably ethylene oxide (oxirane), propylene oxide (methyloxirane) or butylene oxide (ethyloxirane) to an initiator molecule containing on the average two or more active hydrogens. Examples of preferred initiator molecules are dihydric initiators such as ethylene glycol, propylene glycol, butylene glycol, neopentyl glycol, 1,6-hexanediol, hydroquinone, resorcinol, the bisphenols, aniline and other aromatic monoamines, aliphatic monoamines, and monoesters of glycerine; trihydric initiators such as glycerine, trimethylolpropane, trimethylolethane, N-alkyl-phenylenediamines, mono-, di-, and trialkanolamines; tetrahydric initiators such as ethylene diamine, propylenediamine, 2,4'-,2,2'-and 4,4'-methylenedianiline, toluenediamine, and pentaerythritol; pentahydric initiators such as diethylenetriamine; and hexahydric and octahydric initiators such as sorbitol and sucrose. Addition of alkylene oxide to the initiator molecules may take place simultaneously or sequentially when more than one alkylene oxide is used, resulting in block, heteric, and block-heteric polyoxyalkylene polyethers. The number of hydroxyl groups will generally equal the number of active hydrogens in the initiator molecule. Processes for preparing such polyethers are described both in the *Polyurethane Handbook* and *Polyurethanes: Chemistry and Technology* as well as in many patents, for example U.S. Pat. No. 1,922,451; 2,674,619; 1,922,459; 3,190,927; and 3,346,557.

Polyester polyols also represent preferred polyurethane-forming reactants. Such polyesters are well known in the art and are prepared simply by polymerizing polycarboxylic acids or their derivatives, for example their acid chlorides or anhydrides, with a polyol. Numerous polycarboxylic acids are suitable, for example malonic acid, citric acid, succinic acid, glutaric acid, adipic acid, pimelic acid, azelaic acid, sebacic acid, maleic acid, fumaric acid, terephthalic acid, and phthalic acid. Numerous polyols are suitable, for example the various aliphatic glycols, trimethylolpropane and trimethylolethane, α-methylglucoside, and sorbitol. Also suitable are low molecular weight polyoxyalkylene glycols such as polyoxyethylene glycol, polyoxypropylene glycol, and block and heteric polyoxyethylene-polyoxypropylene glycols. These lists of dicarboxylic acids and polyols are illustrative only, and not limiting. An excess of polyol should be used to ensure hydroxyl termination, although carboxyl groups are also reactive with isocyanates. Methods of preparation of such polyester polyols are given in the *Polyurethane Handbook* and in *Polyurethanes: Chemistry and Technology*.

Also suitable as the polyol are polymer modified polyols, in particular the so-called graft polyols. Graft polyols are well known to the art, and are prepared by the in situ polymerization of one or more vinyl monomers, preferably acrylonitrile and styrene, in the presence of a polyether or polyester polyol, particularly polyols containing a minor amount of natural or induced unsaturation. Methods of preparing such graft polyols may be found in columns 1-5 and in the Examples of U.S. Pat. No. 3,652,639; in columns 1-6 and the Examples of U.S. Pat. No. 3,823,201; particularly in columns 2-8 and the Examples of U.S. Pat. No. 4,690,956.

Non-graft polymer modified polyols are also preferred, for example those prepared by the reaction of a polyisocyanate with an alkanolamine in the presence of a polyol as taught by U.S. Pat. Nos. 4,293,470; 4,296,213; and 4,374,209; dispersions of polyisocyanurates containing pendant urea groups as taught by U.S. Pat. No. 4,386,167; and polyisocyanurate dispersions also containing biuret linkages as taught by U.S. Pat. No. 4,359,541. Other polymer modified polyols may be prepared by the in situ size reduction of polymers until the particle size is less than 20 μm, preferably less than 10 μm.

Also useful in preparing polyurethanes are monomers containing other functional groups which are reactive with isocyanates. Examples of these are preferably the amines, for example the substituted and unsubstituted toluenediamines and methylenedianilines; the alkanolamines; the amino-terminated polyoxyalkylene polyethers; and sulfhydryl terminated polymers, to name but a few. The alkanolamines and amines, particularly diamines, are particularly useful, as the amino group reacts faster than the hydroxyl group and thus these molecules can act as isocyanate chain extenders in situ without the need to prepare prepolymers. Examples of hindered, alkyl substituted aromatic diamines which are particularly useful are disclosed in U.S. Pat. No. 4,218,,543.

Many isocyanates are useful in the preparation of urethanes. Examples of such isocyanates may be found in columns 8 and 9 of U.S. Pat. No. 4,690,956, herein incorporated by reference. The isocyanates preferred are the commercial isocyanates toluenediisocyanate (TDI) methylenediphenylenediisocyanate (MDI), and crude or polymeric MDI. Other isocyanates which may be useful include isophoronediisocyanate and tetramethylxylylidenediisocyanate. Other isocyanates may be found in the *Polyurethane Handbook*, Chapter 3, §3.2 pages 62-73 and *Polyurethanes: Chemistry and Technology* Chapter II, §II, pages 17-31.

Modified isocyanates are also useful. Such isocyanates are generally prepared through the reaction of a commercial isocyanate, for example TDI or MDI, with a low molecular weight diol or amine, or alkanolamine, or by the reaction of the isocyanates with themselves. In the former case, isocyanates containing urethane, biuret, or urea linkages are prepared, while in the latter case isocyanates containing allophanate, carbodiimide, or isocyanurate linkages are formed.

Chain extenders may also be useful in the preparation of polyurethanes. Chain extenders are generally considered to be low molecular weight polyfunctional compounds or oligomers reactive with the isocyanate group. Aliphatic glycol chain extenders commonly used include ethylene glycol, propylene glycol, 1,4-butanediol, and 1,6-hexanediol. Amine chain extenders include aliphatic monoamines but especially diamines such as ethylenediamine and in particular the aromatic diamines such as the toluenediamines and the alkylsubstituted (hindered) toluenediamines.

Other additives and auxiliaries are commonly used in polyurethanes. These additives include plasticizers, flow control agents, fillers, antioxidants, flame retardants, pigments, dyes, mold release agents, and the like. Many such additives and auxiliary materials are discussed in the *Polyurethane Handbook* in Chapter 3, §3.4, pages 90–109; and in *Polyurethanes: Chemistry and Technology*, Part II, Technology.

Polyurethanes may be prepared in the form of films and coatings, fibers, extruded forms, castings and foams. Non-cellular or microcellular polyurethanes are prepared in substantial absence of blowing agents, while polyurethane foams contain an amount of blowing agent which is inversely proportional to the desired foam density. Blowing agents may be physical (inert) or reactive (chemical) blowing agents. Physical blowing agents are well known to those in the art and include a variety of saturated and unsaturated hydrocarbons having relatively low molecular weights and boiling points. Examples are butane, isobutane, pentane, isopentane, hexane, and heptane. Generally the boiling point is chosen such that the heat of the polyurethane-forming reaction will promote volatilization. The most commonly used physical blowing agents, however, are currently the halocarbons, particularly the chlorofluorocarbons. Examples are methyl chloride, methylene chloride, trichlorofluoromethane, dichlorodifluoromethane, chlorotrifluoromethane, chlorodifluoromethane, the chlorinated and fluorinated ethanes, and the like. Brominated hydrocarbons may also be useful. Blowing agents are listed in the *Polyurethane Handbook* on page 101. Current research is directed to lowering or eliminating the use of chlorofluorocarbons in polyurethane foams.

Chemical blowing agents are generally low molecular weight species which react with isocyanates to generate carbon dioxide. Water is the only practical chemical blowing agent, producing carbon dioxide in a one to one mole ratio based on water added to the foam formulation. Unfortunately, completely water-blown foams have not proven successful in many applications, and thus it is common to use water in conjunction with a physical blowing agent.

Blowing agents which are solids or liquids which decompose to produce gaseous byproducts at elevated temperatures can in theory be useful, but have not achieved commercial success. Air, nitrogen, argon, and carbon dioxide under pressure can also be used in theory, but have not proven commercially viable. Research in such areas continues, particularly in view of the trend away from chlorofluorocarbons.

Polyurethane foams generally require a surfactant to promote uniform cell sizes and prevent foam collapse. Such surfactants are well known to those skilled in the art, and are generally polysiloxanes or polyoxyalkylene polysiloxanes. Such surfactants are described, for example, in the *Polyurethane Handbook* on pages 98–101. Commercial surfactants for these purposes are available from a number of sources, for example from Wacker Chemie, the Union Carbide corporation, and the Dow-Corning Corporation.

Processes for the preparation of polyurethane foams and the equipment used therefore are well known to those in the art, and are described, for example, in the *Polyurethane Handbook* in Chapter 4, pages 117–160 and in *Polyurethanes: Chemistry and Technology*, Part II, Technology, in Chapter VII, §§III and IV on pages 7–116 and Chapter VIII, §§III and IV on pages 201–238.

For polyurethane rigid foams, the preferred polyols are those having a functionality of 3 or greater, for example polyether polyols prepared by oxyalkylating initiators such as glycerine, trimethylolpropane, pentaerythritol, toluene diamine, starch, sucrose, fructose, α-methylglucoside, and the like. When the isocyanate component comprises at least in part polymeric MDI such that the isocyanate functionality is greater than two, then the functionality of the polyol component may be reduced accordingly. To aid in reducing friability of the foam, minor portions of polyols having a functionality of two or between two and three may be added. Particularly preferred polyether polyols are PLURACOL® polyol 1132, a dipropylene glycol/toluene diamine co-initiated polyol having a nominal hydroxyl number of 450 and a nominal functionality of about 3.8 and containing ethylene oxide residues and about 56 percent by weight propylene oxide residues; and PLURACOL® polyol GP430, a glycerine initiated, all propylene oxide polyol having a nominal hydroxyl number of about 400 and a functionality of three.

Polyester polyols generally have functionalities of between two and 3. Suitable polyester polyols are Stepanpol™ PS-2502 having a nominal hydroxyl number of 250. Polyester polyols are often used in conjunction with polyether polyols. Such a suitable polyether polyol is PLURACOL® polyol 975, a sucrose/dipropylene glycol coinitiated all propylene oxide polyol having a nominal hydroxyl number of 400 and a functionality of approximately 4.4.

The isocyanate component is preferably MDI or polymeric MDI. Suitable isocyanates are, for example LUPRANATE™ M20, M20S, M70L, and M200. Modified MDIs such as LUPRANATE™ MM103 and LUPRANATE™ MP-102 containing urethane and carbodiimide modified MDI may also be useful, particularly in minor quantity. Toluenediisocyanate may also be useful, but is not preferred.

The ternary blowing agent system contains as necessary components, HCFC-22, water, and a third blowing agent selected from the group consisting of methylene chloride and TCE. Water is generally present in an amount greater than 0.1 weight percent and preferably greater than 1.0 weight percent based on the weight of the polyol component of the resin side of the resin/iso reactants. The amount of water is less than 10 weight percent, preferably less than 7 weight percent on the same basis.

The amount of HCFC-22 is greater than 1 weight percent up to about 20 weight percent based on the weight of the polyol component, and preferably from 4 to 8 weight percent on this same basis. If desired, to minimize problems due to vapor pressure of HCFC-22, a portion of the total HCFC-22 may be dissolved in the isocyanate component (B-side). The HCFC-22 is generally metered into the appropriate component under pressure until such time that the requisite amount has been added. When large amounts, i.e. more than about 5 weight percent of HCFC-22 are desired, the polyol and/or isocyanate component may be maintained under pressure.

The amount of the third blowing agent, methylene chloride, TCE, or mixtures of these, ranges from 1 weight percent to about 20 weight percent based on the weight of the polyol component, and preferably from 5 to about 20 weight percent on the same basis. As is the case with the HCFC-22, a portion or all of the methylene chloride or TCE may be added to the isocyanate side of the polyurethane reactants. The water present, however, must remain in the polyol side of the system. For Examples 1–13 and Comparative Examples 14–19 when appropriate, the following experimental procedure was utilized.

EXPERIMENTAL

The resin blends for these experiments were prepared as follows:

1) A master resin blend was prepared with the appropriate amounts of polyol, surfactant and catalyst. This blend was well mixed.

2) 500 grams of the above blend were weighed into a 1 liter three-neck flask. The desired amount of TCE (or $MeCl_2$), and water were added.

3) The three-neck flask was assembled with an agitator, gas aspirator, and an alcohol/dry ice cold trap with a bubbler. The gas aspirator helps disperse the HCFC-22 into the mixing resin. The cold trap condenses and returns "any" TCE (or $MeCl_2$) and/or catalyst back into the resin. The bubbler was used to adjust the flow, and pressure of HCFC-22 into the flask such that there was a slight pressure in the system (~1 inch water pressure).

4) The flask was weighed periodically to determine when the resin is saturated with HCFC-22. After the resin had reached saturation (indicated by constant weight), it was poured into a loosely capped bottle and left over night. Any weight loss was noted and the formulation was adjusted.

5) Steps 2, 3 & 4 were repeated for each formulation.

6) The resins were cooled to ~40° F. and hand mixed using
standard techniques. Cooling the resin helped minimize frothing during hand mixing.

7) The samples were cured and submitted for physical testing.

SUMMARY

The formulations presented in Table 1 produced a wide range of foam densities, from 1.2 up to 2.6 PCF. Identities of the polyol components are listed supra. This data shows that both TCE and $MeCl_2$ are effective blowing agents for urethane foams (i.e. they reduce foam density ). The dimensional stability of the foams co-blown with either TCE or $MeCl_2$ and HCFC-22/water were good (i.e. <8% volume change @158° F./100% RH) at foam densities above 1.6 PCF. Below 1.6 PCF the foams became unstable (>10% volume change); especially the foams containing $MeCl_2$. The aged k-factors for the $MeCl_2$ co-blown foams ranged from 0.2 to 0.26. The aged k-factors for the TCE co-blown foams were typically 0.19 to 0.21. The Physical properties of the prepared at 15% packing and a constant density (2PCF) foams are given in Table 2.

A series of polyurethane and polyisocyanurate foams were machine run on a PUROMAT 30 polyurethane foam machine and injected into standard Brettmolds. The Brett mold is a standard tool for rigid/appliance foam flowability evaluations. The dimensions of the tool are 5 cm by 20 cm by 200 cm. A uniform mold temperature (110-120° F.) is maintained by a water/glycol system. In table 4, the components are as follows:

Polyol A is a toluenediamine/dipropylene glycol initiated polyol having a functionality of c.a. 3.8 and a hydroxyl number of 450, containing 55.7% propylene oxide residues, the remainder being residues of ethylene oxide.

Polyol B is an all propylene oxide, glycerin initiated polyol with a functionality of 3 and a hydroxyl number of 260.

Polyol C is a sucrose/dipropylene glycol initiated all propylene oxide derived polyol having a functionality of c.a. 4.4 and a hydroxyl number of 397.

Polyol D is Stepanpol TM 2502A

DMCHA is dimethylcyclohexylamine

TCE is trichloroethylene

Hexchem 977 is an isocyanurate promoting catalyst

DABCO TMR-30 is a urethane catalyst available from Air Products and Chemicals.

In machine runs employing large quantities of polyol, the gaseous HFC-22 is added through a series of valves into the day tank. This series of valves comprises a metering valve, a check valve, and a shut-off valve with a pressure gauge attached to the output side of the metering pump. The resin blend, containing water and either or both of methylene chloride and trichloroethane is weighed into the day tank, following which the resin is recirculated with the recirculation pump output pressure between 110 and 120 psi. As the vapor pressure of HCFC-22 is approximately 136 psi at room temperature, opening the series of valves described above allows the HCFC-22 to bleed into the recirculating resin stream as a flashing liquid. When the desired weight percent of HCFC-22 has been added, the valves are shut off and machine runs made as is normal for liquid blowing agents.

The appearance of these foams were quite good, with a fine cell structure. It should be noted that the densities of these foams were rather high. The free rise qt. cup (nominal 1000 ml size) densities for this series ranged from 2.6 to 3.8 PCF. Increasing the density of urethane foam generally enhances the appearance and physical properties of the foam. The 140° F. aged k-factor of the foams improves with increasing levels of TCE. This is the same trend observed with polyether based foams. After 30 days aging at 140° F. the foam k-factor was nominally 0.21 when using 5 to 15 pbw TCE (with water and ~3 wt. % HCFC-22).

The foams made in this study exhibited very good dimensional stability. The maximum percent volume change for foams aged 28 days at 158° F./100% RH ranged from a couple percent up to ten percent volume change. The foams from this study had a good fine cell structure, with a high percentage of closed cells. The tumbling friability of the foams were moderate to high with test values from 6 to 20 wt. % loss.

In TCE/water/HCFC-22 co-blown formulations, TCE was observed to be an effective blowing agent for polyester isocyanurate formulations. As observed for polyether based foam formulations, increasing the level of TCE in the formulation improves the k-factor of the resulting foam. However it was also observed that increasing the TCE level weakens the foam compression strength. The saturation level of HCFC-22 in these polyester resin formulations ranged from 2.4 to 3.8 wt. %. Because of these relatively low levels the resulting foam densities are high (ranging from 2.0 to 3.8 PCF). Because of these high densities, data for flammability and dimensional stability must be interpreted conservatively. The foam formulation data and physical properties of free rise foams is given in Table 1, while Tables 2 and 3 reflect the physical properties of foams with 15% packing and packed foams of 2.0 $lb/ft^3$ density respectively.

TABLE 1

#10 LILY CUPS - FREE RISE FOAMS

| SAMPLE | 1 | 2 | 3 | 4 | 5 | 6 | 7 | 8 | 11 | 12 |
|---|---|---|---|---|---|---|---|---|---|---|
| POLYOL A | 50 | 50 | 50 | 50 | 50 | 50 | 50 | 50 | 50 | 50 |
| POLYOL B | 50 | 50 | 50 | 50 | 50 | 50 | 50 | 50 | 50 | 50 |
| DOW CORNING 193 | 2 | 2 | 2 | 2 | 2 | 2 | 2 | 2 | 2 | 2 |
| DMCHA | 2 | 2 | 2 | 2 | 2 | 2 | 2 | 2 | 2 | 2 |
| TRICHLOROETHANE | 5 | 5 | 10 | 10 | 10 | 15 | 15 | 20 | | |
| WATER | 3 | 5 | 1 | 4 | 7 | 3 | 5 | 4 | 5 | 5 |
| HCFC-22 | 6.8 | 4.6 | 6.2 | 6.1 | 4.8 | 6.2 | 5.8 | 5.9 | 6.3 | 5.7 |
| TOTAL | 118.8 | 118.6 | 121.2 | 124.1 | 125.8 | 128.2 | 129.8 | 133.9 | 118.3 | 119.7 |
| LUPRANATE H20-S | 160.1 | 192.7 | 127.3 | 176.4 | 225.3 | 160.1 | 192.7 | 176.4 | 160.1 | 192.7 |
| % HCFC-22 | 5.7 | 3.9 | 5.1 | 4.9 | 3.8 | 4.8 | 4.5 | 4.4 | 5.3 | 4.8 |
| LILY CUP DENSITY, PCF CORE | 1.89 | 1.53 | 2.55 | 1.60 | 1.29 | 1.66 | 1.35 | 1.50 | 1.76 | 1.50 |
| SSC 158 F./100% RH | | | | | | | | | | |
| 1 DAY | −2.6 | −6.7 | 0.7 | −3.8 | −21.4 | 0.6 | −4.0 | 2.9 | −3.2 | −17.9 |
| 2 DAYS | −3.0 | −6.1 | 1.4 | −3.8 | −19.9 | 1.8 | −4.9 | 3.0 | −3.7 | −20.3 |
| 7 DAYS | −2.5 | −5.7 | 1.8 | −1.4 | −13.7 | 1.9 | −0.2 | 6.6 | −2.7 | −17.7 |
| 14 DAYS | −2.1 | −4.7 | 1.3 | −0.9 | −11.3 | 2.5 | 4.8 | 7.6 | −3.0 | −16.5 |
| 28 DAYS | 0.8 | 0.0 | 3.5 | 2.0 | −3.3 | 7.6 | 9.6 | 12.5 | 0.3 | −11.4 |
| −20 F. | | | | | | | | | | |
| 1 DAY | −0.4 | −1.0 | −0.3 | −0.4 | −18.3 | −0.3 | −18.9 | −0.9 | −0.5 | −5.6 |
| 2 DAYS | 0.4 | −0.4 | −1.1 | 0.2 | −18.0 | 1.2 | −19.3 | −1.5 | 0.3 | −7.8 |
| 7 DAYS | 1.8 | 0.4 | 0.2 | 1.4 | −16.3 | 1.5 | −21.6 | −1.7 | 0.8 | −7.9 |

| SAMPLE | 13 | 14 | 15 | 16 | 17 | 18 | 19 |
|---|---|---|---|---|---|---|---|
| POLYOL A | 50 | 50 | 50 | 50 | 50 | 50 | 50 |
| POLYOL B | 50 | 50 | 50 | 50 | 50 | 50 | 50 |
| DOW CORNING 193 | 2 | 2 | 2 | 2 | 2 | 2 | 2 |
| DMCHA | 2 | 2 | 2 | 2 | 2 | 2 | 2 |
| TRICHLOROETHANE | | | | | | | |
| WATER | 1 | 4 | 7 | 3 | 5 | 4 | 4 |
| HCFC-22 | 6.2 | 5.3 | 5.7 | 5.6 | 6.1 | 5.5 | 5.7 |
| TOTAL | 121.2 | 123.3 | 126.7 | 127.6 | 130.1 | 133.5 | 113.7 |
| LUPRANATE H20-S | 127.5 | 176.4 | 225.3 | 160.1 | 192.7 | 176.4 | 176.4 |
| % HCFC-22 | 5.1 | 4.3 | 4.5 | 4.4 | 4.7 | 4.1 | 5.0 |
| LILY CUP DENSITY, PCF CORE | 2.13 | 1.39 | 1.14 | 1.40 | 1.23 | 1.20 | 1.74 |
| SSC 158 F./100% RH | | | | | | | |
| 1 DAY | −1.7 | −38.7 | * | −45.5 | −47.8 | * | −2.7 |
| 2 DAYS | −1.3 | −38.2 | | −43.4 | −46.9 | | −3.3 |
| 7 DAYS | −1.0 | −36.3 | | −40.3 | 43.5 | | −2.1 |
| 14 DAYS | −1.0 | −35.3 | | −40.0 | 43.5 | | −1.9 |
| 28 DAYS | 3.3 | −30.5 | | −35.8 | −41.1 | | 2.2 |
| −20 F. | | | | | | | |
| 1 DAY | 0.0 | −30.4 | * | −35.3 | −44.0 | * | −0.1 |
| 2 DAYS | 0.5 | −35.9 | | −32.3 | −43.7 | | 0.0 |
| 7 DAYS | 2.2 | −35.0 | | −34.4 | −42.6 | | 1.4 |

*SAMPLE SHRINKAGE AFTER CUTTING

TABLE 2

TCE AND MeCl₂ CO-BLOWN FOAM WITH HCFC-22/WATER BLOWING AGENT
PHYSICAL TEST DATA PACKED BOXES - 15%

| SAMPLES | 1 | 2 | 3 | 4 | 5 | 6 | 7 | 8 | 11 | 12 |
|---|---|---|---|---|---|---|---|---|---|---|
| DENSITY (PCF) OVERALL, DENSITY CORE | 1.94 | 1.55 | 2.71 | 1.65 | 1.48 | 1.74 | 1.47 | 1.53 | 1.88 | 1.55 |
| K-FACTOR INITIAL | 0.161 | 0.167 | 0.153 | 0.165 | 0.191 | 0.156 | 0.154 | 0.156 | 0.161 | 0.169 |
| 10 DAYS | 0.169 | 0.176 | 0.161 | 0.168 | 0.225 | 0.158 | 0.194 | 0.161 | 0.181 | 0.187 |
| 30 DAYS | 0.189 | 0.207 | 0.162 | 0.193 | 0.238 | 0.163 | 0.210 | 0.188 | 0.200 | 0.213 |
| 100 DAYS | | | | | | | | | | |
| POROSITY | 94.2 | 95.9 | 93.8 | 94.1 | 85.5 | 86.6 | 78.1 | 92.6 | 97.2 | 91.8 |
| SSC 158 F./100% RH | | | | | | | | | | |
| 1 DAY | 1.4 | 0.6 | −1.0 | −0.5 | −18.2 | 2.9 | −0.2 | 2.5 | 0.2 | −0.7 |
| 2 DAYS | 0.6 | −1.7 | −1.6 | −2.1 | −13.1 | 1.0 | −9.6 | 0.7 | −0.6 | −2.3 |
| 7 DAYS | 0.5 | −0.6 | −0.3 | −3.7 | −10.8 | 0.7 | −13.9 | 0.9 | −1.0 | −6.4 |
| 14 DAYS | −0.1 | −10.4 | −3.7 | −4.9 | −10.2 | 0.8 | −12.2 | 1.2 | −2.0 | −6.2 |
| 20 DAYS | 2.8 | −6.1 | −0.9 | −1.4 | −6.9 | 3.8 | −8.1 | 4.0 | 1.1 | −5.6 |
| 200 F./0% RH | | | | | | | | | | |
| 1 DAY | −1.0 | −2.2 | −0.4 | −1.8 | −15.7 | −0.5 | −6.3 | −0.5 | −1.0 | −2.8 |
| 2 DAYS | −1.8 | −3.0 | 0.3 | −1.9 | −14.6 | −0.8 | −9.2 | −0.5 | −1.3 | −3.3 |
| 7 DAYS | 0.3 | −3.0 | 2.2 | 0.1 | −8.7 | 1.6 | −4.2 | 2.3 | −0.8 | −3.2 |
| 14 DAYS | −1.8 | −4.0 | 0.8 | −1.3 | −8.3 | 0.9 | −3.6 | 0.5 | −2.4 | −4.1 |
| 28 DAYS | 0.1 | −0.8 | 2.5 | 2.2 | −4.3 | 2.6 | 1.6 | 2.9 | −0.2 | −2.1 |

TABLE 2-continued

| | | | | | | | | | | |
|---|---|---|---|---|---|---|---|---|---|---|
| −20 F. | | | | | | | | | | |
| 1 DAY | −0.3 | −0.3 | −0.2 | −0.5 | −3.9 | −0.3 | −1.9 | −0.7 | 0.3 | −0.8 |
| 2 DAYS | 0.5 | −0.1 | −0.2 | 0.0 | −6.5 | 0.0 | −3.5 | −0.2 | 1.4 | 0.0 |
| 7 DAYS | 0.8 | 0.5 | 0.4 | 0.7 | −20.8 | 0.3 | −8.3 | 0.9 | 1.9 | 0.8 |

| SAMPLES | 13 | 14 | 15 | 16 | 17 | 18 | 19 |
|---|---|---|---|---|---|---|---|
| DENSITY (PCF) OVERALL, DENSITY CORE | 2.35 | 1.53 | 1.25 | 1.54 | 1.31 | 1.41 | 1.87 |
| K-FACTOR INITIAL | | | | | | | |
| 10 DAYS | 0.158 | 0.166 | 0.164 | 0.158 | 0.163 | 0.154 | 0.170 |
| 30 DAYS | 0.193 | 0.251 | 0.306 | 0.249 | 0.251 | 0.235 | 0.193 |
| 100 DAYS | 0.212 | 0.262 | 0.309 | 0.250 | 0.259 | 0.246 | 0.217 |
| POROSITY | 99.9 | 93.9 | 93.1 | 95.1 | 75.8 | 65.6 | 102.9 |
| SSC | | | | | | | |
| 158 F./100% RH | | | | | | | |
| 1 DAY | 1.6 | −5.1 | −20.3 | −19.1 | −22.7 | −26.4 | 0.2 |
| 2 DAYS | −0.7 | −18.9 | −53.5 | −30.2 | −26.7 | −33.0 | −0.2 |
| 7 DAYS | −0.7 | −24.0 | −35.0 | −30.4 | −24.4 | −33.8 | −0.1 |
| 14 DAYS | −1.3 | −25.6 | −34.5 | −28.9 | −25.0 | −34.0 | −1.5 |
| 20 DAYS | 0.1 | −22.5 | −29.9 | −25.4 | −21.8 | −30.9 | 0.1 |
| 200 F./0% RH | | | | | | | |
| 1 DAY | −1.6 | −16.2 | −20.4 | −19.3 | −21.1 | −19.7 | −1.4 |
| 2 DAYS | −1.5 | −8.5 | −15.2 | −20.5 | −25.2 | −10.4 | −1.7 |
| 7 DAYS | −1.0 | −6.5 | −14.4 | −14.9 | −22.6 | −14.3 | −0.7 |
| 14 DAYS | −2.3 | −8.0 | −11.0 | −15.4 | −22.9 | −13.5 | −2.8 |
| 28 DAYS | −1.1 | −5.1 | −7.6 | −11.1 | −10.5 | −9.7 | −1.3 |
| −20 F. | | | | | | | |
| 1 DAY | −0.3 | −1.0 | −11.3 | −5.4 | −4.4 | −11.0 | −0.4 |
| 2 DAYS | 0.5 | −1.5 | −8.2 | −8.3 | −7.2 | −18.9 | −0.6 |
| 7 DAYS | 1.6 | −3.6 | −17.1 | −13.9 | −21.9 | −25.5 | 1.5 |

TABLE 3

TCE AND MeCl₂ CO-BLOWN FOAM WITH HCFC-22/WATER BLOWING AGENT
PHYSICAL TEST DATA PACKED BOXES - 2.0PCF

| | 1 | 2 | 3 | 4 | 5 | 6 | 7 | 8 | 11 | 12 |
|---|---|---|---|---|---|---|---|---|---|---|
| DENSITY (PCF) OVERALL, DENSITY CORE | 1.89 | 1.73 | — | 1.76 | 1.45 | 1.79 | 1.64 | 1.69 | 1.76 | 1.69 |
| K-FACTOR INITIAL | | | | | | | | | | |
| 10 DAYS | 0.158 | 0.170 | — | 0.170 | 0.177 | 0.156 | 0.164 | 0.159 | 0.163 | 0.171 |
| 30 DAYS | 0.173 | 0.186 | — | 0.180 | 0.194 | 0.173 | 0.178 | 0.174 | 0.189 | 0.201 |
| 100 DAYS | 0.189 | 0.202 | — | 0.195 | 0.210 | 0.189 | 0.188 | 0.187 | 0.203 | 0.216 |
| POROSITY | 91.6 | 93.1 | — | 93.0 | 93.6 | 90.1 | 93.1 | 93.7 | 95.7 | 93.5 |
| SSC | | | | | | | | | | |
| 158 F./100% RH | | | | | | | | | | |
| 1 DAY | −0.1 | 0.8 | — | 0.6 | −0.7 | 2.5 | 0.9 | 2.0 | −2.0 | 0.3 |
| 2 DAYS | −0.8 | 0.9 | — | 0.7 | 0.0 | 2.4 | 1.1 | 2.0 | −1.8 | 0.2 |
| 7 DAYS | −0.5 | 1.1 | — | 0.6 | 0.6 | 2.2 | 1.0 | 2.7 | −1.5 | −0.1 |
| 14 DAYS | −1.0 | −0.4 | — | 0.2 | 0.5 | 0.8 | 0.5 | 1.6 | −2.3 | −0.8 |
| 28 DAYS | 0.8 | 0.9 | — | 2.2 | 2.5 | 2.3 | 1.8 | 3.2 | −0.9 | 0.1 |
| 200 F./0% RH | | | | | | | | | | |
| 1 DAY | −1.2 | −2.0 | — | −1.0 | −1.1 | 0.0 | −1.6 | 0.1 | −1.9 | −1.5 |
| 2 DAYS | −1.7 | −2.3 | — | −1.5 | −1.46 | −0.4 | −1.7 | −0.1 | −2.6 | −1.9 |
| 7 DAYS | 0.3 | −2.1 | — | 0.0 | 0.0 | 3.0 | 0.2 | 1.5 | −0.6 | −0.7 |
| 14 DAYS | 0.0 | −0.9 | — | 0.8 | −0.2 | 4.6 | 1.2 | 2.1 | −0.5 | −1.3 |
| 28 DAYS | 0.1 | −0.8 | — | 2.2 | −4.3 | 2.6 | 1.6 | 2.9 | −0.2 | −2.1 |
| −20 F. | | | | | | | | | | |
| 1 DAY | −0.6 | −0.3 | — | −0.9 | −0.4 | −0.8 | −0.8 | −0.1 | −1.0 | −0.7 |
| 2 DAYS | −0.6 | −0.1 | — | −0.5 | −1.0 | −0.8 | −0.7 | 0.2 | −0.7 | 0.1 |
| 7 DAYS | −0.1 | 0.7 | — | 1.1 | −0.1 | −0.2 | 0.3 | 0.8 | 0.5 | 1.2 |

| | 13 | 14 | 15 | 16 | 17 | 18 | 19 |
|---|---|---|---|---|---|---|---|
| DENSITY (PCF) OVERALL, DENSITY CORE | 2.32 | 1.71 | 1.57 | 1.80 | 1.58 | 1.60 | 1.89 |
| K-FACTOR INITIAL | | | | | | | |
| 10 DAYS | 0.158 | 0.168 | 0.174 | 0.166 | 0.172 | 0.170 | 0.170 |
| 30 DAYS | 0.196 | 0.195 | 0.210 | 0.194 | 0.201 | 0.201 | 0.195 |
| 100 DAYS | 0.212 | 0.212 | 0.221 | 0.213 | 0.218 | 0.219 | 0.210 |
| POROSITY | 92.5 | 91.7 | 93.1 | 92.9 | 91.7 | 91.6 | 92.9 |
| SSC | | | | | | | |
| 158 F./100% RH | | | | | | | |
| 1 DAY | −1.5 | −0.4 | −1.1 | 1.0 | 0.2 | 0.5 | 1.1 |
| 2 DAYS | −2.4 | −.05 | −1.1 | 0.3 | −0.9 | −0.7 | 0.2 |
| 7 DAYS | −1.5 | −1.1 | −1.0 | −1.0 | −0.9 | −1.4 | −0.4 |
| 14 DAYS | −1.6 | −1.6 | −1.3 | −2.0 | −1.9 | −2.1 | −1.6 |

TABLE 3-continued

|  | | | | | | | |
|---|---|---|---|---|---|---|---|
| 28 DAYS | −0.5 | −0.8 | −0.1 | −1.0 | −1.2 | 0.8 | 0.6 |
| 200 F./0% RH | | | | | | | |
| 1 DAY | −2.0 | −1.3 | −1.6 | −1.9 | −2.0 | −1.7 | −2.0 |
| 2 DAYS | −2.7 | −1.5 | −2.6 | −2.9 | −2.4 | −2.4 | −2.0 |
| 7 DAYS | −0.9 | −0.9 | −1.6 | −2.0 | −1.9 | −2.6 | −0.8 |
| 14 DAYS | −0.2 | −0.5 | −1.5 | −2.1 | −2.2 | −2.8 | −1.4 |
| 28 DAYS | −1.1 | −5.1 | −7.6 | −11.1 | −18.5 | −9.7 | −1.3 |
| −20 F. | | | | | | | |
| 1 DAY | −0.2 | −0.6 | −0.5 | −1.0 | −0.2 | −0.1 | −0.5 |
| 2 DAYS | −0.8 | 0.1 | −0.3 | −0.4 | −0.1 | 0.4 | 0.3 |
| 7 DAYS | 0.2 | 0.8 | 0.7 | 0.6 | 0.5 | 1.1 | 0.8 |

TABLE 4

|  | 20 | 21 | 22 | 23 |
|---|---|---|---|---|
| POLYOL A | 50 | 50 | 50 | — |
| POLYOL B | 50 | 50 | 50 | — |
| POLYOL C | — | — | — | 10 |
| POLYOL D | — | — | — | 90 |
| DC 193 | 2 | 2 | 2 | 2 |
| DMCHA | 2.5 | 2.5 | 2.5 | 0.5 |
| DABCO TMR-30 | — | — | — | 0.5 |
| HEXCHEM 977 | — | — | — | 2.0 |
| WATER | 2 | 2 | 4 | 1.25 |
| TCE | 10 | 20 | 20 | 15.0 |
| ISO A | 143.8 | 143.8 | 176.4 | 203.8 |
| ISO INDEX | 110 | 110 | 110 | 250 |
| DENSITY (10% BRETTMOLD) | 2.54 | 2.48 | 2.07 | 2.28 |
| K-FACTOR | | | | |
| INITIAL | 0.150 | 0.149 | 0.153 | 0.136 |
| 10 DAYS | 0.171 | 0.173 | 0.170 | 0.142 |
| 30 DAYS | 0.189 | 0.189 | 0.187 | 0.151 |
| CLOSED CELL CONTENT | 91.9 | 93.6 | 93.4 | 0.166 |
| SSC (−20° F.) | | | | |
| 1 DAY | 0.1 | 0.1 | 0.0 | −0.3 |
| 2 DAYS | 0.5 | 0.6 | −0.1 | 0.0 |
| 1 WEEK | 2.1 | 2.2 | 2.0 | 1.6 |

What is claimed is:

1. A dimensionally stable, low k-factor polyurethane or polyisocyanurate rigid foam having a density from about 1.3 to about 3.0 lbs/ft$^3$, containing in its cells carbon dioxide, monochlorodifluoromethane, and a third blowing agent component selected from the group consisting of methylene chloride, 1,1,1-trichloroethane, and mixtures thereof.

2. The foam of claim 1 wherein the density of said foam is greater than about 1.6 pounds/ft$^3$.

3. A rigid foam, prepared by the process of reacting
   a) an organic isocyanate;
   b) an isocyanate reactive component comprising one or more polyols selected from the group consisting of polyoxyalkylene polyether polyols, polyester polyols, and mixtures thereof;
   c) an effective amount of one or more catalysts which promote the formation of urethane and/or isocyanurate linkages; and
   d) a ternary blowing agent mixture comprising
      i) water,
      ii) monochlorodifluoromethane, and
      iii) a third blowing agent component selected from the group consisting of methylene chloride, 1,1,1,-trichloroethane, and mixtures thereof,
   at an isocyanate index of from 70 to about 900.

4. The foam of claim 3 wherein said ternary blowing agent comprises
   i) amount of from 1 to about 10 percent by weight;
   ii) HCFC-22 in an amount of from 1 to about 20 percent by weight;
   iii) from 1 to about 20 percent by weight of a third blowing agent component selected from the group consisting of methylene chloride, 1,1,1-trichloroethane, and mixtures thereof,
   wherein all said percents by weight are percents by weight relative to the weight of component b).

5. The foam of claim 3 wherein said ternary blowing agent comprises
   i) in an amount of from 1 to about 7 weight percent;
   ii) HCFC-22 in an amount of from 4 to about 8 weight percent; and
   iii) from 5 to about 15 weight percent of a blowing agent component selected from the group consisting of methylene chloride, 1,1,1,-trichloroethane, and mixtures thereof.
   wherein said weight percents are weight percents relative to the weight of component b).

6. The foam of claim 3 wherein the density of said foam is from about 1.6 pounds/ft$^3$ to about 3 pounds/ft$^3$.

7. The foam of claim 4 wherein the density of said foam is from about 1.6 pounds/ft$^3$ to about 3 pounds/ft$^3$.

8. The foam of claim 5 wherein the density of said foam is from about 1.6 pounds/ft$^3$ to about 3 pounds/ft$^3$.

9. In a process for the preparation of a rigid foam containing urethane and/or isocyanurate linkages by the reaction of a polyol component with an isocyanate component, the improvement comprising selecting as a blowing agent for said foam a ternary blowing agent comprising
   i) water in an amount of from 0.1 to about 10 weight percent;
   ii) monochlorodifluoromethane in an amount of from about 1 to about 20 weight percent; and
   iii) a third blowing agent component selected from the group consisting of methylene chloride, 1,1,1-trichloroethane, and mixtures thereof in an amount of from 1 to about 20 weight percent,
   wherein all said weight percents are based on the weight of the polyol component.

10. The process of claim 9 wherein water is present in an amount of from 1 to about 7 weight percent: monochlorodifluoromethane is present in an amount of from 1 to about 8 weight percent; and said third blowing agent component is present in an amount of from 5 to about 15 weight percent, wherein said foam has a density of greater than 1.6 pounds/ft$^3$.

* * * * *